Nov. 20, 1951     B. E. LENEHAN     2,575,720
INSTRUMENT BALANCE MECHANISM
Filed April 19, 1947
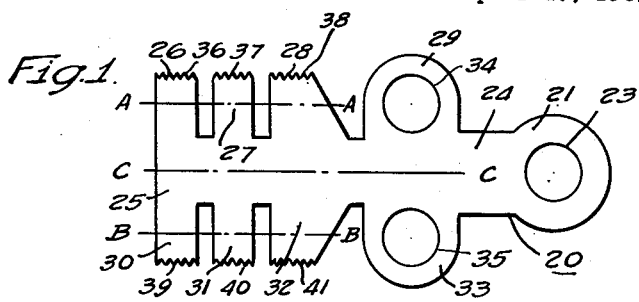
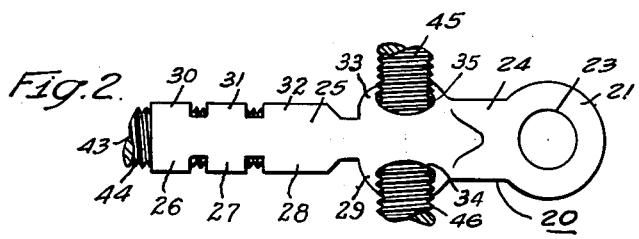
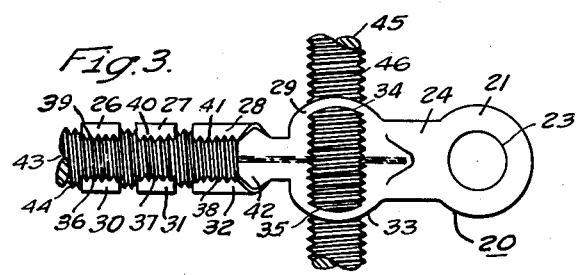
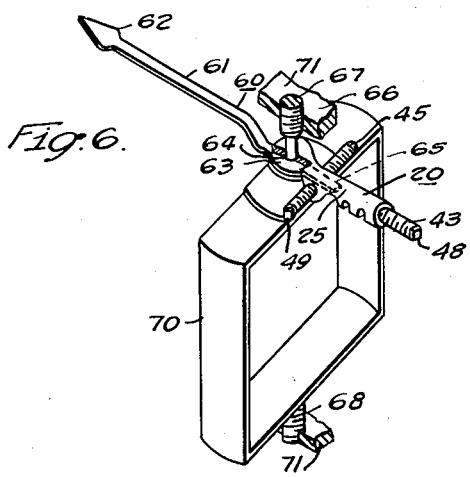
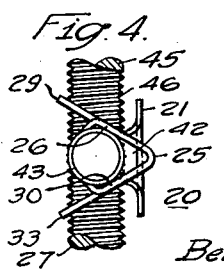
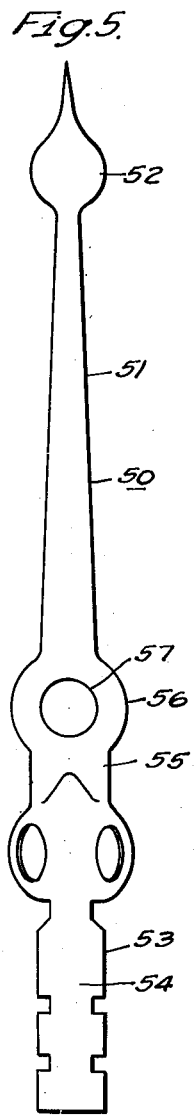
WITNESSES:
INVENTOR
Bernard E. Lenehan.
BY
ATTORNEY Patented Nov. 20, 1951

2,575,720

UNITED STATES PATENT OFFICE 2,575,720

INSTRUMENT BALANCE MECHANISM

Bernard E. Lenehan, Bloomfield, N. J., assignor to Westinghouse Electric Corporation, East Pittsburgh, Pa., a corporation of Pennsylvania Application April 19, 1947, Serial No. 742,693

12 Claims. (Cl. 116—136.5)

The present invention relates to indicating instruments, and particularly to balance mechanisms therefor.

In instruments, such as small electrical instruments of the ammeter or voltmeter type, an extremely small force acts upon the movement carrying the pointer and balance mechanism to effect rotation thereof. Therefore, it is desirable to employ a balance weight support which is lightweight and possesses the desired rigidity for supporting masses or weights.

In order to effect proper readings of the instruments in various positions, the movement with its pointer is properly balanced by the adjustment of counterweights on the pointer. A satisfactory, lightweight, balance weight support for pointers which is simple, inexpensive and dependable, has continued to be sought in the art. The more prevalent balance weight support has been in the shape of a cruciform, having three arms to which weights are secured. Weights employed on the arms are of various types, including the nut or locknut type, the wire-wound type and the clamp type.

The nut or locknut type of weight is expensive to make because the small taps, which are required for internal threading, are expensive and have a very short life. The wire-wound type of weight, which is wound helically, is simpler to manufacture, but requires special skill to apply it to the arms of the balance weight support. The instrument is likely to become unbalanced subsequent to adjustment if the wire-wound type is applied to the arm with mechanical stresses remaining in the wire, such stresses tending to cause the wire to creep along the arms, especially if the instrument is subject to vibration or impact. Clamping weights have also been employed, but adjustment is very tedious when the weights require adjustments within close tolerance, for instance in frequent cases within three-thousandths of an inch.

In the present invention it is proposed to produce from sheet material, a balance weight support which lends itself to mass production, and to employ therewith weights in the form of externally threaded screws. Considering the fact that the diameter of the screws to be employed with the support may be smaller than the diameter of the standard lead employed in mechanical pencils, the importance of simplicity and exact adjustments becomes apparent.

It is an object of the present invention to provide a new and novel balance mechanism for indicating instruments.

It is a further object to provide for an indicating instrument, an improved balance weight support of sheet material, which is relatively simple and inexpensive to manufacture.

It is still a further object to provide for association with a pointer structure in an instrument, a balance mechanism employing one or more weights in the form of a screw for adjusting or balancing the instrument.

Other objects and advantages of the present invention will appear in the following detailed description, read in conjunction with the accompanying drawing, in which:

Figure 1 is a plan view of a blank from which a balance weight support is made;

Fig. 2 is a top plan view of a balance mechanism with balance screws, having parts broken away, supported by a balance weight support shaped from the blank shown in Fig. 1;

Fig. 3 is a bottom plan view of the balance mechanism shown in Fig. 2;

Fig. 4 is an end view of the balance mechanism shown in Figs. 2 and 3;

Fig. 5 is a plan view of a pointer structure in which a balance support is integral with a pointer; and Fig. 6 is a perspective view, with parts broken away, of an instrument with a movement comprising a movable element, a pointer, and an adjustable balance mechanism.

Referring to Fig. 1, the blank from which the balance weight support 20 is shaped, is formed or stamped from a thin, lightweight, resilient, non-magnetic sheet material, such as an aluminum alloy. The balance weight support 20 comprises a lug portion 21, which is disc shaped and has a pivot or shaft receiving opening 23 therein, an intermediate portion 24 and a root portion 25. The root portion 25 has wings 26, 27 and 28, and an ear 29 extending from the upper side thereof. Similarly, wings 30, 31 and 32, and ear 33 extend from the lower or opposite side of the root portion 25, the wings 30, 31 and 32 being opposite to wings 26, 27 and 28, respectively, and ear 33 being opposite to ear 29. The ears 29 and 33 have apertures 34 and 35 therein, respectively, for receiving a transverse balance screw, the apertures 34 and 35 being in substantial alignment and equi-distant from the center of the root portion 25. The extreme ends of the wings 26, 27, 28, 30, 31 and 32 have teeth or serrations 36, 37, 38, 39, 40 and 41, respectively, along the edge thereof. The root portion 25 is joined to the lug portion 21 by the intermediate portion 24.

The formation of a balance weight support 20 as shown in Fig. 2 can best be described with reference to Fig. 3. To form the balance weight support 20 shown in Fig. 3, the tips of the wings 26, 27 and 28 are bent upwardly along the broken line A—A (see Fig. 1) and the tips of the wings 30, 31 and 32 are similarly bent upwardly along the broken line B—B. The tips are, in each case, bent to form an angle substantially perpendicular to the root portion 25. As the next step, the sides of the root portion 25 are bent upwardly along the broken line C—C which extends longitudinally along the center of the root portion 25 so that the sides thereof with their respective wings and ears, are at an acute angle to each other.

With reference to Figs. 3 and 4, it will be observed that by bending the sides of the root portion 25 inwardly, a cavity 42 is thereby formed therebetween. The tips of the wings 26, 27, 28, 30, 31 and 32 are positioned so as to engage a longitudinal weight screw 43, the serrations 36, 37, 38, 39, 40 and 41 thereon, respectively, being proportioned and positioned to mesh with the threads 44 on the longitudinal weight screw 43. By rotating and advancing or retracting the longitudinal weight screw 43, a very fine longitudinal balance adjustment is obtainable.

It will be observed that the axis of the linear mass or weight screw 43 is an axis which extends longitudinally along or adjacent the integral balance weight support 20, and that the wings 26, 27, 28, 30, 31 and 32 are angularly spaced about such axis. The wings 26, 27 and 28 are positioned in a plane parallel to such axis and each wing has a tip or portion turned to extend inwardly in the general direction of such axis. Similarly, the wings 30, 31 and 32 are positioned in another plane also parallel to such axis and each wing has a tip or portion turned inwardly toward such axis or the weight screw 43. Disregarding the portions of the wings or tips turned inwardly in the direction of the weight or screw 43, the plane containing wings 26, 27 and 28 is at an angle to the plane containing the wings 30, 31 and 32, and both planes are parallel to such axis.

The wings 26, 27 and 28 extending from the linear root portion 25 are spaced from each other along the side of the root portion 25, while the wings 30, 31 and 32 extending from the other side of the root portion 25 are also spaced from each other.

Furthermore, the wings 26, 27 and 28 extending from one side of the root portion 25 are spaced from and are at an angle with the wings 30, 31 and 32 extending from the other side of the root portion 25. Although only one or two wings may be adequate, each of the wings 26, 27, 28, 30, 31 and 32 aids in retaining or maintaining the longitudinal balance weight screw 43 in a longitudinal position adjacent the root portion 25 of the balance weight support 20.

By contacting the longitudinal weight screw 43 on opposite sides and over a substantial area on at least one of the sides, the longitudinal weight screw 43 may be supported by the balance weight support 20 at any adjusted position. By contacting the longitudinal weight screw 43 from three sides, the longitudinal weight screw may be more readily supported by the balance weight support 20. In Fig. 4, is shown the longitudinal weight screw 43 in the cavity 42 contacted on two sides by the wings 26 and 30, and on two sides opposite the wings 26 and 30, by the center of root portion 25. Since the wings 26 and 30 are resiliently positioned with respect to the center of the root portion 25, the longitudinal weight screw 43 could be positioned by being contacted by one wing, such as the wing 26, and, on the opposite side, by the center of the root portion 25 over a substantial area. The longitudinal weight screw is even more definitely positioned when contacted on three sides, or, as shown in Fig. 4 on four sides, by employing wings 26 and 30 on two sides about the axis of the longitudinal weight screw 43.

A plurality of wings extending from either or both sides of the root portion 25 facilitates retaining the longitudinal weight screw 43 within the cavity 42 in such a manner as to avoid rocking or slight side-motion of the screw. The teeth or serrations on each wing are permitted to grip the linear mass or screw independently of the teeth or serrations on adjacent wings. Although three pairs of wings, namely 26 and 30, 27 and 31, and 28 and 32, have been illustrated, it is recognized that a larger or smaller number of pair of wings may be employed, or that the number of wings on one side of the root portion 25 need not correspond to the number of wings on the opposite side; however, in the interest of symmetry, pairs of wings are preferable.

The ears 29 and 33 are shown in Figs. 3 and 4 at an acute angle to each other, thereby permitting a transverse weight screw 45 having threads 46 thereon to extend through the aligned apertures 34 and 35 which may be internally threaded. If the apertures 34 and 35 are threaded, it may be preferable to have the ears in substantially parallel relationship to each other instead of at an acute angle as shown. However, to avoid any internal threading operation it is advantageous to have the diameter of the apertures 34 and 35 slightly larger than the diameter of the transverse weight screw 45. To position the transverse weight screw 45 through the apertures 34 and 35, the ends of the ears 29 and 33 may be compressed and moved toward each other slightly so that the ears are substantially closed to a parallel relationship. While in this relationship the transverse weight screw 45 may be readily inserted and positioned in the apertures 34 and 35. Upon removing the compression force, the ears 29 and 33 tend to resume their normal angle to each other and exert a biasing force causing the edges on opposite sides of the apertures 34 and 35 to engage the threads 46 and securely retain the transverse weight screw 45 in the desired position. By rotating the transverse weight, the screw 45 may be advanced or retracted with reference to the balance weight support 20, and a very fine transverse balancing adjustment may be made.

Since the balance weight support 20 is formed of sheet material and the pointer is also usually made of similar sheet material, it is likely to be found advantageous to produce a pointer structure having the pointer and balance weight support integral, as shown in Fig. 5. With reference to Fig. 5, the pointer 50 comprises a stem or shaft 51, terminating at one end in a target 52. The balance weight support 53, which is integral with the pointer 50 comprises a root portion 54, an intermediate portion 55, and an enlarged portion 56 having a pivot or shaft receiving opening 57 therein. Portions 54, 55 and 56 of balance weight support 53 are in every respect similar to portions 25, 24 and 21, respectively, of balance weight support 20, except that the stem or shaft 51 is integral with the enlarged portion 56, and extends away from the balance weight support 53 along an axis extending through the pivot receiving opening 57 and the center of the root portion 54 of the balance weight support 53. Longitudinal and transverse weight screws are positioned in and supported by, the balance weight support 53 in the same manner as with respect to balance weight support 20 in Figs. 2, 3 and 4.

In Fig. 6, a pointer structure is shown associated with a moving element 70 of an electrical instrument, having a pointer 60 separate from the balance weight support 20. The pointer 60 in Fig. 6 comprises a stem or shaft 61, a target 62, an enlarged portion 63 and a tail portion 65, the shaft 61 terminating at one end in the target 62 and having at the other end the enlarged portion 63 with a pivot receiving opening 64 therein. Various means may be employed to maintain the pointer 60 and the balance weight support 20 in proper relation with respect to each other, such as clamping or fastening them together. To facilitate associating the balance weight support 20 with the pointer 60, the pointer 60 is shown with the tail portion 65 (in dotted lines) extending rearwardly away from the shaft 61 beyond the opening 64. The balance weight support 20 is similar to the structure shown in Figs. 2, 3 and 4 as above-described. The rotatable element 70 of the instrument has a pivot pin 66 which is positioned in a bearing screw 67. A similar pivot extends from the lower portion of the movable element and is positioned in a bearing screw 68. The bearing screws 67 and 68 are in threaded engagement with the instrument frame or stationary portion 71.

It will be observed that, as a preferred method of associating the pointer 60 with the balance weight support 20, the tail portion 65 extends rearwardly under the balance weight support 20 adjacent or into the cavity 42 beneath the root portion 25 so that the pointer structure which comprises the pointer 60 and the balance weight support 20 will move integrally with the moving element 70.

As illustrated in Fig. 6, the axis of the longitudinal weight screw 43 is substantially perpendicular to the axis of the shaft or pivot pin 66 about which the weight support 20 rotates. Furthermore, the axis of the transverse weight screw 45 which is an axis extending through the openings, holes or apertures 34 and 35 of the ears 29 and 33, is substantially perpendicular both to the axis of the pivot or pivot pin 66 and to the axis of the longitudinal weight screw 43, the latter axis being an axis extending longitudinally adjacent or along the weight support 20.

In Fig. 6, an adjustable balance mechanism is shown comprising a balance weight support 20 having the longitudinal weight screw 43 and a transverse weight screw 45 positioned therein and supported therein in the same manner as described with reference to Figs. 2, 3 and 4. The ends of the screws 43 and 45 are provided with suitable heads such as square heads 48 and 49, respectively, which may be engaged by a tool to facilitate rotation thereof. To increase the weight of the screws, the heads 48 and 49 may be considerably larger than the diameter of the screws.

From the foregoing, it will appear that the balance weight support 20 and the balance weight support 53 with the pointer 50 integral therewith, are very inexpensive, both from the standpoint of material costs and from the standpoint of manufacturing costs. Likewise, the weights are in the form of externally threaded screws, which are relatively simple to manufacture because the threads may be readily cut or rolled thereon. No internal or female threads are employed in the preferred embodiment of the invention, requiring the use of taps either in the weights or in the balance weight support. A much larger piece of sheet material is required where the conventional cruciform cross-arm is employed as a balance weight support for an instrument. While the conventional cruciform employs three adjustable weights for balancing, the present invention employs only two adjustable weights.

Since modifications of the particular form of the invention shown in the drawing will appear to those skilled in the art, it is intended that the present invention shall be limited only by the spirit and scope of the appended claims.

I claim as my invention:

1. In an adjustable balance mechanism, a balance weight support formed of sheet material for supporting a weight screw, said balance weight support having ears turned in the same general direction with respect to each other, said ears having apertures therein to permit the weight screw to extend through said apertures and to be adjustably retained therein transversely to an axis about which the balance weight support rotates, said balance weight support having means for supporting a linear mass transversely to the weight screw.

2. In an adjustable balance mechanism, a linear weight, and an integral weight support formed of sheet material for supporting the linear weight, said weight support embodying means for association with a shaft and having a plurality of spaced ears having openings spaced along an axis extending at an angle relative to the shaft, the ears being resiliently positioned and biasing the linear weight extending therethrough adjacent such shaft.

3. In a measuring instrument including a movement having at least one pivot about which said movement is rotatable, the combination with said movement of an adjustable balance mechanism for counter-balancing said movement, comprising an adjustable balance weight screw and a balance weight support having means for association with said pivot and a plurality of engaging wings projecting angularly therefrom and spaced about an axis extending longitudinally adjacent said balance weight support, said adjustable balance weight screw being positioned by engagement with said wings for rotation on said axis.

4. In an adjustable balance mechanism, an integral weight support for supporting an adjustable balance weight, having a plurality of wings angularly spaced about an axis which would extend axially through such adjustable balance weight, and spaced from each other along said axis.

5. In an indicating instrument having a movement supported by at least one pivot, a pointer structure and a balance weight support each engaging said pivot, said pointer structure having a stem portion, and a tail portion extending rearwardly from said stem portion, said balance weight support having a recess to receive said tail portion, whereby said balance weight support and said pointer structure are maintained in definite relationship to each other when associated with said pivot.

6. A counter-weight support for supporting a substantially cylindrical counter-weight with an axis extending therethrough, said counter-weight support having a root portion with wing portions protruding from opposite sides thereof, said wing portions having end-portions turned inwardly for engaging the counter-weight on opposite sides of the axis and above the axis when the counter-weight is positioned between the wing portions, with the root portion below the axis adjacent the counter-weight.

7. In an adjustable balance mechanism, an integral balance weight support having a plurality of retaining wings for retaining in position a separate balance weight, said wings being angularly spaced about an axis which extends longitudinally adjacent said weight support, at least one of the wings positioned substantially in a plane parallel to said axis having at least a portion turned to extend inward toward said axis.

8. An adjustable balance mechanism comprising a balance weight support and a balance weight screw, said balance weight support having a plurality of wings angularly spaced from each other about an axis which extends adjacent said balance weight support and extends axially through the balance weight screw, said balance weight screw being positioned by said wings for rotation on said axis.

9. An adjustable balance mechanism comprising a balance weight support and a balance weight screw, said balance weight support having a plurality of wings angularly spaced from each other about an axis which extends adjacent said balance weight support and extends axially through the balance weight screw, said balance weight screw being positioned by said wings for rotation on said axis, at least one of said wings having serrations proportioned to mesh with the threads of said balance weight screw.

10. In an adjustable balance mechanism, an integral weight support having a plurality of wings angularly spaced from each other about a first axis which extends longitudinally adjacent said weight support, said weight support including spaced ears having openings therein spaced along a second axis extending at an angle relative to the first axis, means mounting the weight support for rotation about a third axis substantially at right angles to the first and second axes.

11. In a measuring instrument having a rotatable element and pointer, an integral weight support formed of sheet material for supporting a linear mass, said weight support comprising a linear root portion having at least one wing extending therefrom, said wing being turned inwardly toward said root portion and positioned to engage a linear mass adjustably retained between said wing and said root portion, said weight support being employed to support weights for counterbalancing the rotatable element and pointer of the measuring instrument.

12. A pointer balancing structure comprising a weight support shaped to provide at least three wings extending from not more than two sides of the weight support, said wings being angularly spaced about an axis which extends longitudinally adjacent said weight support.

BERNARD E. LENEHAN.

REFERENCES CITED

The following references are of record in the file of this patent:

UNITED STATES PATENTS

| Number | Name | Date |
| --- | --- | --- |
| 1,029,042 | Beede | June 11, 1912 |
| 1,114,971 | Diefendorf | Oct. 27, 1914 |
| 1,154,979 | Ellis | Sept. 8, 1915 |
| 1,801,778 | MacGahan | Apr. 21, 1931 |
| 2,294,054 | Thompson | Aug. 25, 1942 |

FOREIGN PATENTS

| Number | Country | Date |
| --- | --- | --- |
| 21,028 | Great Britain | Aug. 3, 1905 |
| 638,826 | France | Feb. 28, 1928 |